G. R. Moore,
Double-Seaming Sheet-Metal.
No. 4,768.   Patented Sep. 19, 1846.
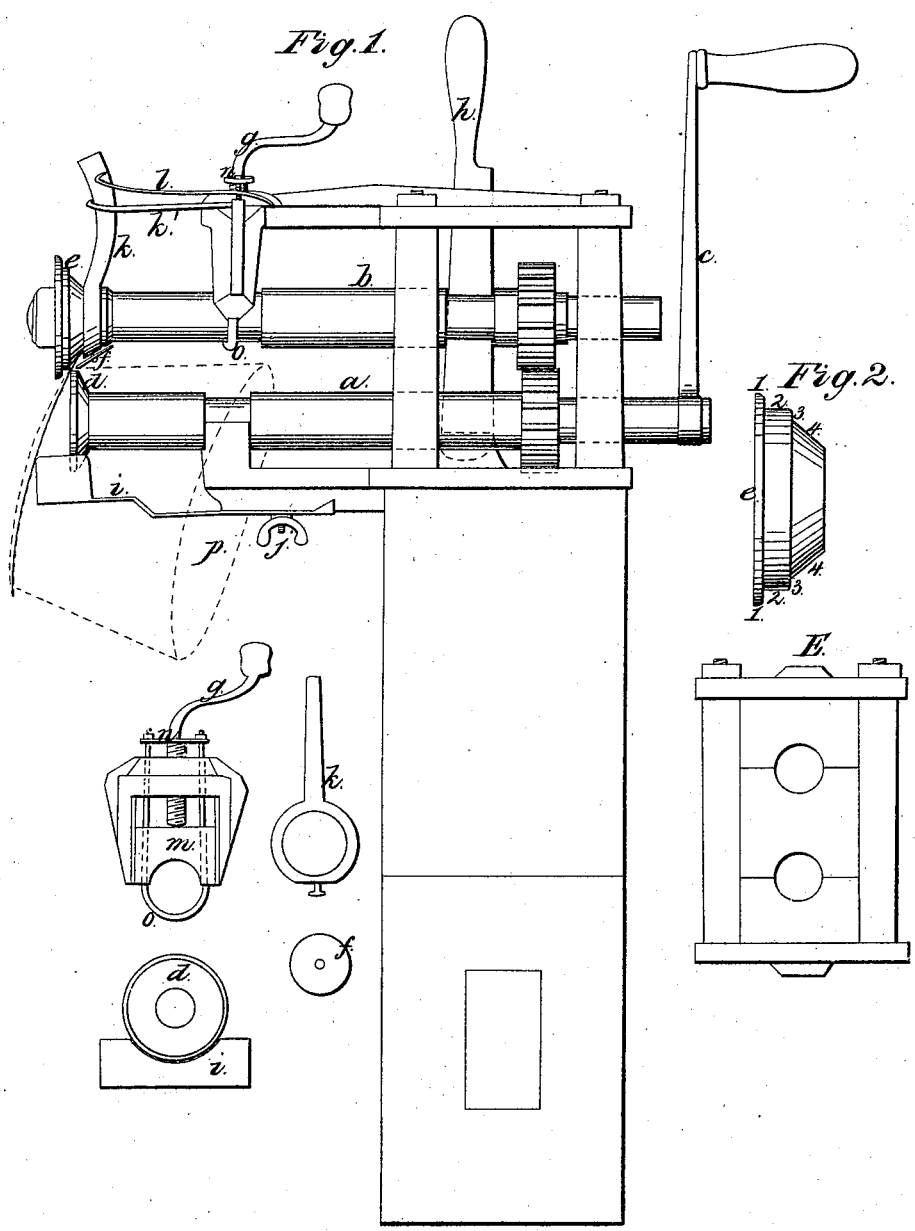

UNITED STATES PATENT OFFICE.

G. R. MOORE, OF PHILADELPHIA, PENNSYLVANIA.

IMPROVEMENT IN MACHINERY FOR DOUBLE-SEAMING.

Specification forming part of Letters Patent No. 4,768, dated September 19, 1846.

*To all whom it may concern:*

Be it known that I, GEORGE R. MOORE, of the city and county of Philadelphia, and State of Pennsylvania, have invented certain new and useful improvements in double-seaming machines for double-seaming the bottoms of tin pans and other articles made of sheet tin, copper, &c., requiring a like process; and I hereby declare that the following is a full, clear, and exact description of the principle or character which distinguishes them from all other things before known, and of the manner of making, constructing, and using the same, reference being had to the accompanying drawings, making part of this specification, in which—

Figure 1 is a front view.

The same letters indicate like parts in all the figures.

All the parts that are not lettered compose the frame simply, the construction of which is obvious from the drawings, as it is similar to that of the common machines for bending tin, and made of the same materials. A sectional drawing, E, shows the end of the frame toward the crank with the boxes in it, which is precisely similar to the common tin-working machines for wiring, turning, &c. The other end of the frame is precisely similar to Peck's swaging-machine, but the construction of the frame may be varied.

I proceed to describe the working machinery, noticing, first, the two arbors $a$ and $b$, which are connected by cog-wheels and turned by the crank $c$. Two heads, $d$ and $e$, are affixed to the ends of these arbors, and between these heads the double-seaming is performed. A pan, $p$, is represented in dotted lines as placed over the head $d$ on the lower arbor, so as to bring the edge which is to be seamed down between the head $e$ and a small roller, $f$, hereinafter described. The shape of the head $e$ should be carefully noticed, and is shown in the diagram Fig. 2. This head consists of a flange, 1, projecting from a cylindrical surface, 2, similar to some other machines now in use. This cylindrical surface is terminated by a shoulder, 3, that connects with a conical molding, 4. The bevel surface of the head $e$ bears first upon the edge of the pan which is sustained by the head $d$, (the shoulder 3 above named coming against the bottom,) and the edge is forced to yield to the bevel of the head $e$ as this is screwed down upon it by means of the screw $g$, and should any part of it be inclined to slip out toward the top of the pan (as this edge is always composed of three thicknesses) it is prevented from so doing by the little roller $f$, attached to a collar, $k$, that surrounds the arbor $b$ near the head. At this stage of the operation the crank $c$ is turned, the pan revolves in the machine, and the edge is turned down as far as the bevel part 4 of head $e$ will turn it, while the shoulder prevents the edge of the pan from bending too far down toward the center. After this the head $e$ must be raised a little by turning a screw, $g$, attached to its box, and then the lever $h$ is brought into use to move the arbor $b$ inward, by which the cylindrical part 2 of the head $e$, which is parallel with the outer surface of $d$, is brought over the same and then screwed down toward it by $g$, when, by again turning the crank, the work is completed. The outside shoulder, 1, of the head $e$ keeps the bottom of the pan close against the head $d$. The lever $h$ passes through an aperture in the top of the frame, where it has room to be moved back and forth, and places are fitted to receive it when so moved, into which it is thrown by a spring, or by its own elasticity. It also passes between two shoulders on the arbor $b$, and its lower end is connected with the frame by a pivot. Its use has already been explained. $i$ is a sliding gage for the purpose of holding in proper position flaring articles, such as the pan represented in the drawings, where the bottom needs to be thrown out from a perpendicular with the arbors in order to bring the body of the pan parallel with them. This gage consists of a shank that is attached by a screw, $j$, to the frame, and is terminated by a head that is just under the head $d$. The bottom of the pan is held out by this gage resting against the inside thereof, which keeps the work steady while being acted on. This is found to be indispensable when the work is made flaring, as shown in the drawings. The gage is fastened, when set or placed right, by the thumb-screw $j$, and the end thereof is also provided with a soft surface, which prevents its rubbing the tin to scratch or mark $i$. When it is not desirable to move the gage, the work will rest against the head $d$, which is faced nearly to the edge with leather (although other materials may be used) to prevent its rubbing the tin. The piece $k$ is a collar with a lever attached thereto. The collar part of it is fitted upon the arbor $b$, allowing the arbor to turn freely in it, while the upper end passes through a loop, $k'$, in the frame to keep it in an upright position, and below the collar is fastened upon a pivot the little roller $f$. The only use of the loop $k'$ is to bring roller $f$ to bear properly upon the work, and to secure this the better the lever $k$ is made crooked at the top, so that by pressing it down this part of it is brought toward the frame, and consequently the roller $f$ is moved up toward $e$, and vice versa. A spring, $l$, is applied to throw $k$ back as it rises up.

In order that the screw $g$ may not only press down arbor $b$ by acting upon the box $m$, but may also have such a connection with it as to raise it up when its own action is reversed, a bow, $o$, is provided, which receives the arbor $b$ and passes up through the box $m$ and the frame, and is connected by a yoke, $n$, to the top of the screw of which $g$ is the crank, turns freely in the yoke $n$.

The object of raising and lowering the arbor $b$ has already been explained.

Having thus fully described my invention, what I claim as my invention, and desire to secure by Letters Patent, is—

1. The combination of the roller $f$ with the head $e$, constructed and arranged substantially in the manner and for the purpose set forth.

2. The combination and arrangement of the gage $i$, in the manner and for the purpose heretofore described, supporting the inside of the vessel at the bottom while being operated upon when the sides thereof are flaring.

3. The employment of the shoulder 3, which terminates the base of the conical part of the head $e$, to keep the bottom in place while making the first bend, as above described.

GEO. R. MOORE.

Witnesses:
   A. P. BROWNE,
   J. J. GREENOUGH.